United States Patent [19]
Maier

[11] 3,966,384
[45] June 29, 1976

[54] MACHINE FOR THE THERMAL EXPANSION OF RIGID PLASTIC TUBING

[76] Inventor: Johann H. Maier, 18584 NE. Second Ave., Miami, Fla. 33162

[22] Filed: Apr. 14, 1975

[21] Appl. No.: 567,503

Related U.S. Application Data

[62] Division of Ser. No. 490,234, July 22, 1974, abandoned.

[52] U.S. Cl. .............................. 425/392; 264/322
[51] Int. Cl.² ........................................ B29C 17/02
[58] Field of Search ............ 264/322, 296; 425/384, 425/392, 393, 403

[56] References Cited
UNITED STATES PATENTS

| | | | |
|---|---|---|---|
| 2,265,111 | 12/1941 | Brown............................ | 425/392 X |
| 3,124,623 | 3/1964 | Slawson ........................ | 264/322 X |
| 3,439,078 | 4/1969 | Whiteford...................... | 264/322 X |
| 3,484,900 | 12/1969 | Sands et al.................... | 425/393 |
| 3,809,737 | 5/1974 | Rogers et al.................. | 264/296 X |
| 3,857,666 | 12/1974 | Barnett.......................... | 425/393 |
| 3,861,847 | 1/1975 | Barnett........................ | 425/384 X |

*Primary Examiner*—Francis S. Husar
*Assistant Examiner*—David S. Safran
*Attorney, Agent, or Firm*—Oltman and Flynn

[57] ABSTRACT

A hydraulic operated machine for expanding lengths of rigid thermo-plastic tubing providing a shiftable table on a base retaining liquid cooling and heating containers movable from a heating to a cooling and a discharge position including means for holding a length of rigid tubing vertically in the heating container. An expansion assembly positioned above the containers adapted to descend into the softened tube in the heating container and forming same by enlargement of the expansion assembly and raising the expanded tube for descent into the cooling container and rigidizing and discharging same following contraction of the expansion assembly.

9 Claims, 10 Drawing Figures

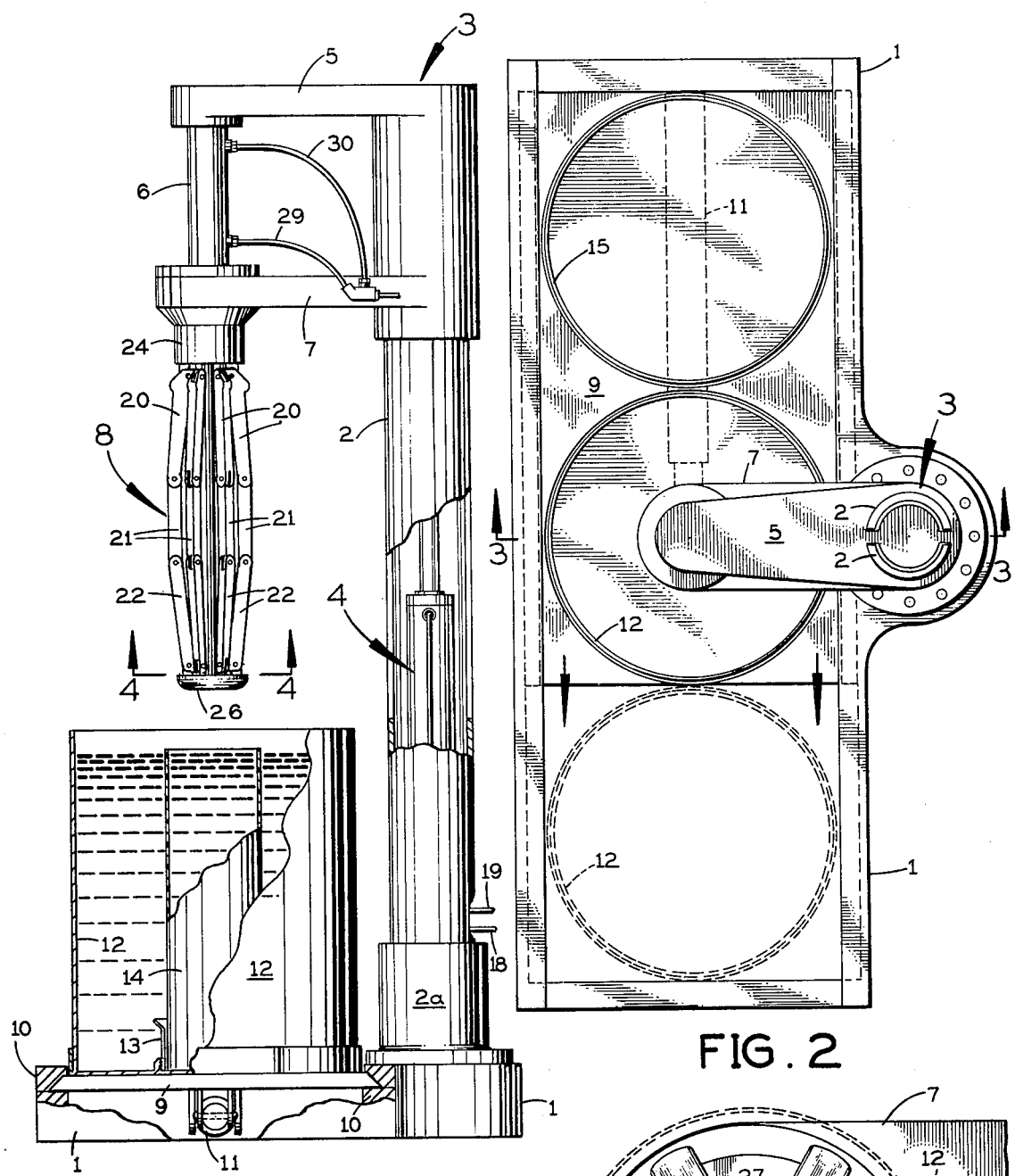
FIG. 1
FIG. 2
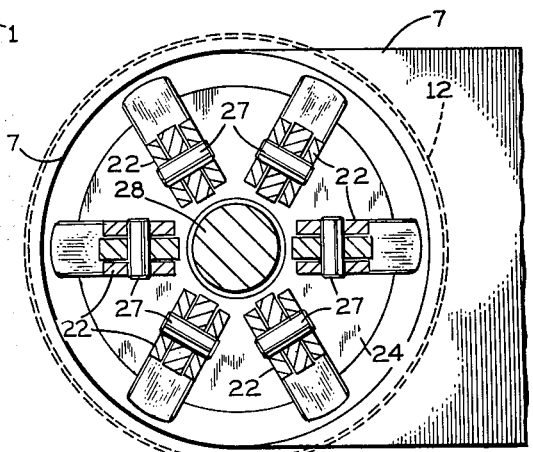
FIG. 4

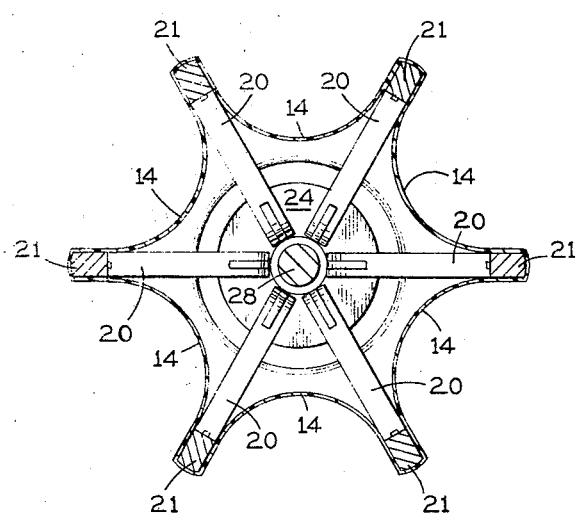
FIG. 6
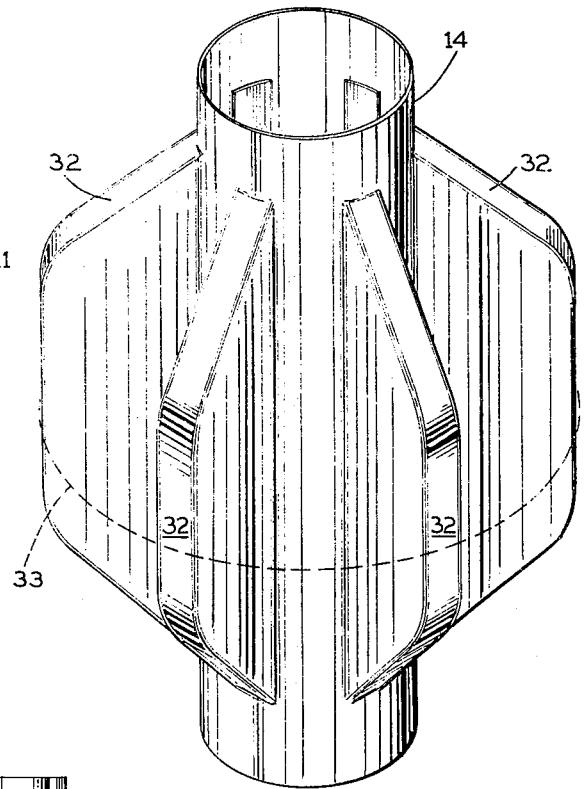
FIG. 8
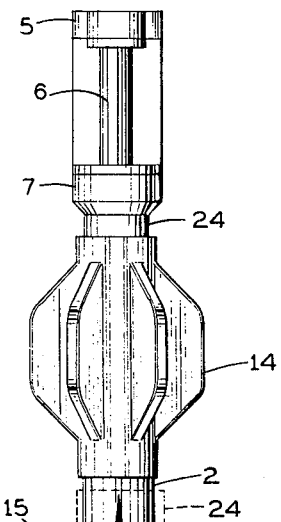
FIG. 7
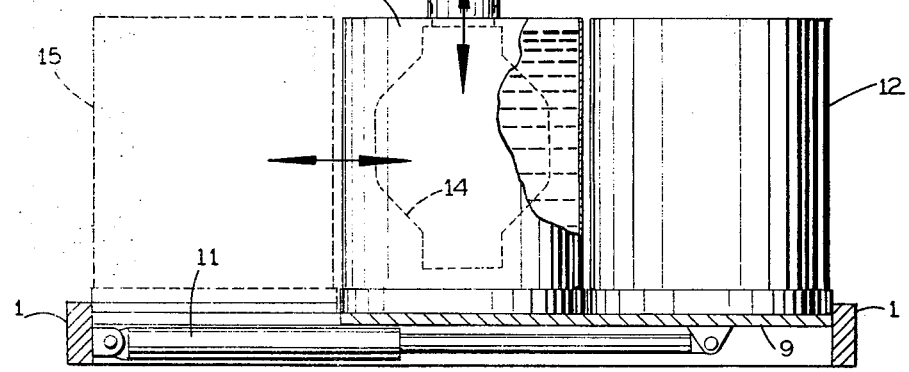

MACHINE FOR THE THERMAL EXPANSION OF RIGID PLASTIC TUBING

RELATED APPLICATION

This application is a division of my copending application Ser. No. 490,234 filed July 22, 1974, and now abandoned.

This invention relates in general to a machine for heating and expanding heat softened thermo-plastic tubing into various predetermined shapes, generally adapted to be cut in two parts for forming twin articles when rigidized at normal temperatures.

Prior to this invention, plastic articles, such as lamp shades, flower pots, and other ornamental vessels, required the costly use of dies adapted for the well known injection molding process. The present machine will form quantities of a desired enlarged or ornamental tubing of a wide variety of shapes without the use of expensive dies or the injection molding process.

Another object of the invention is to form a central portion of a given heat softened plastic tube into an enlarged predetermined shape whereby when cut in transverse direction the portion will form two articles of like characteristics.

Another object of the invention is the provision of a pair of expanded members made from tubing of predetermined diameter and thickness and following the central transverse cutting to hermetically seal the unexpanded end of each formed end by well known welding or adhesive processes.

A further object of the invention is the provision in the machine for substituting a variety of internal expanding assemblies for forming heated plastic tubes into each of a large number of predetermined shapes.

These and other objects and advantages in two embodiments of the invention are described and shown in the following specification and drawings, in which:

FIG. 1 is an end elevation of the machine with portions thereof broken away, and in reduced scale, prior to operation.

FIG. 2 is a top plan view of the machine shown in FIG. 1.

FIG. 4 is a partially enlarged cross sectional view taken through section line 4—4, FIG. 1.

FIG. 6 is a bottom plan view taken through section line 6—6, FIG. 5.

FIG. 7 illustrates the expanded tube on the expandable links as removed from the cooling container.

FIG. 8 is a perspective view of the expanded tube when released from the machine.

Figure 3:
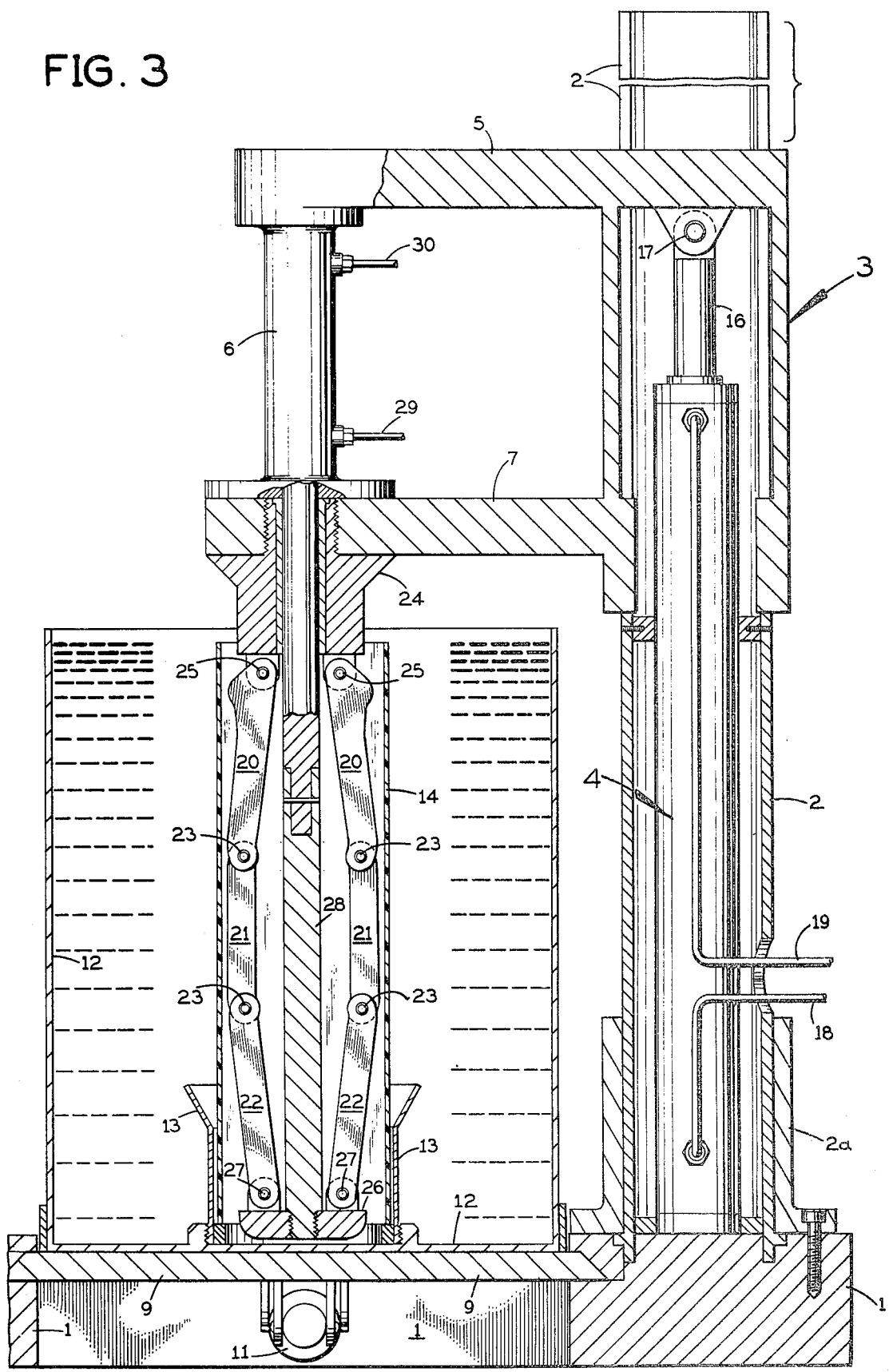
FIG. 3 is a partially enlarged cross sectional view of the machine taken through section line 3—3, FIG. 2, prior to the enlarging operation illustrating a link type expander.

Referring to FIGS. 1 and 2, the machine includes a main base1 which supports at one side a central vertical hollow pillar 2, secured thereto by flange 2a. A slidable body or head assembly 3 is slidably secured for vertical movement on pillar 2 and keyed against rotation by the action of a hydraulic cylinder 4. An offset member 5 of the head assembly retains a vertical hydraulic cylinder 6 in the outer end thereof and a second offset member 7 retains a link assembly 8 adapted to vertical expansion when activated by cylinder 6, to be hereinafter described.

The base 1 includes a planar linear slidable table 9 adapted for slidable movement between angle shaped ways 10, as shown, which is also propelled by hydraulic cylinder means 11 secured to base 1 and the under side of table 9 for movement to three stations when motivated, namely cold, hot and discharge positions. FIG. 2 illustrates the linear movement of the table 9 to each of three positions by well known control means, not shown.

A cylindrical container 12, shown in FIG. 1, has a tube alignment socket 13 secured coaxial on the inner side of the base of the container, as shown, for temporarily securing a thermo-plastic tube 14, of predetermined dimensions, such as polystyrene or vinyl-polymer compounds, to be expanded. A container 12 is provided with well known means, not shown, preferably electric, for heating solutions such as water therein to a predetermined temperature sufficiently high to soften the plastic tube 14 when the tube is immersed in the container 12 by energizing the cylinder 4 for downward movement. A cooling container 15 is positioned adjacent the heating container 12, as shown and retains cool water or other liquid for immersing and rigidizing the preformed plastic tube, to be hereinafter described.

Following the cooling of the forming tube, the link assembly 8 is raised from the cooling solution in container 15 and the slidable table moved to the opposite end of base 1 and the link assembly 5 retracted by hydraulic means for the removal of the rigid formed tube. The piston rod 16 of cylinder 4 is pivotally secured to the head assembly 3 by a transverse pin 17 which head is raised and lowered by the flow of hydraulic fluid through tubes 18 and 19 respectively by well known control means.

The particular forming elements in the machine comprise six pivoted link members 20, 21 and 22 pivoted together by pivots 23 with each of six sets of three links pivoted by a head extension bushing 24 at the upper end thereof by pivots 25—25. The lower end of the six sets of links is pivoted to a flange 26 by pivots 27, which flange is secured coaxial to a piston rod 28 which is operated through a predetermined vertical range by cylinder 6 when energized by pressurized fluid in tubes 29 and 30 respectively.

Figure 5:
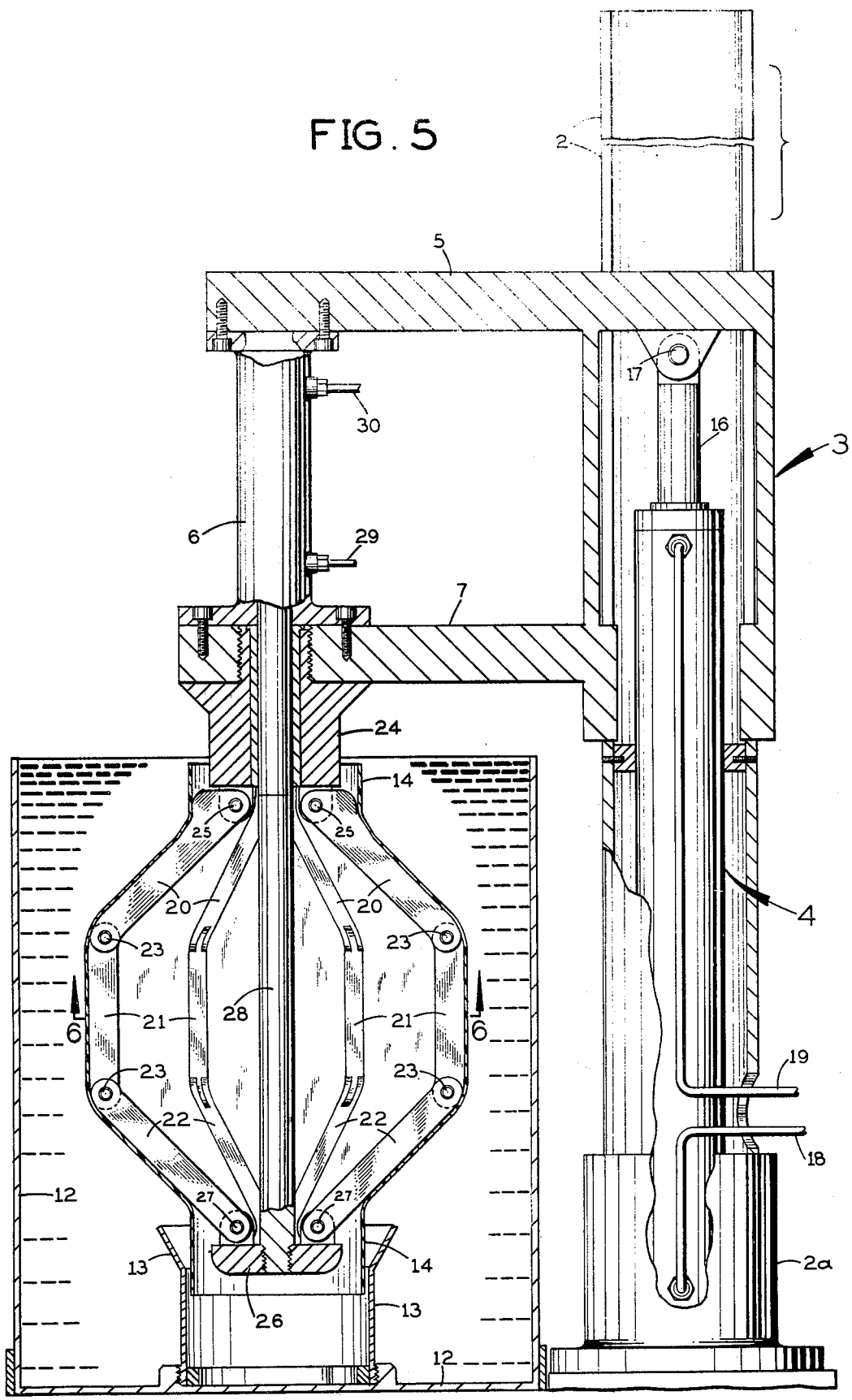
FIG. 5 is a partially enlarged cross sectional view taken through section line 3—3, FIG. 2, with portions thereof expanding a plastic tube.

FIG. 5 illustrates the expansion of link members 20-21-22 when the head assembly 3 and the offset members 5 and 7 are lowered into the heated liquid 13 in the container 12 by the operation of the hydraulic cylinder 4 and its piston rod 16. Then the bushing 24 will retain its lower position and the hydraulic cylinder 6 is then energized by tube 30 which will move the piston rod 28 upward and the flange 26 will move the six sets of links 20–20–22 upward and expand and form the plastic tube 14 softened by the heated liquid 31 within container 12 by the outside contact of each of the six groups of links. At this point the hydraulic cylinder 4 is energized by tube 18 and the container and the link assembly and the formed plastic part will raise via pillar 2 above the top of the container 12 for reimmersion into container 15 for rigidizing the formed plastic member.

FIG. 6 illustrates a cross sectional view of the formed tube 14 which now is still retained by the link members.

FIG. 7 illustrates the outside shape of the formed tube 14 when raised from the cooling solution in container 15 at which time the tube 14 has been retracted from the cooling container 15 which is now moved by the table over the dotted discharge position. Following the cooling operation of the formed tube, the table is moved by energizing cylinder 11 for movement to its discharge position. The next step requires the cylinder 40 to be energized by tube 30 which will project the piston pin to its extended position and retract the links to permit the release of the expanded formed tube 14 onto the surface of the base for removal therefrom.

FIG. 8 illustrates the completed expanded tube with six like projections 32 extending therefrom with concave radiused portions positioned therebetween. A dotted line 33 represents a cutting line for parting the tube into two equal parts, which in this use may be for a pair of lamp shades which includes interesting variations in thickness for providing artistic graduations in lighting or other uses.

Figure 9:
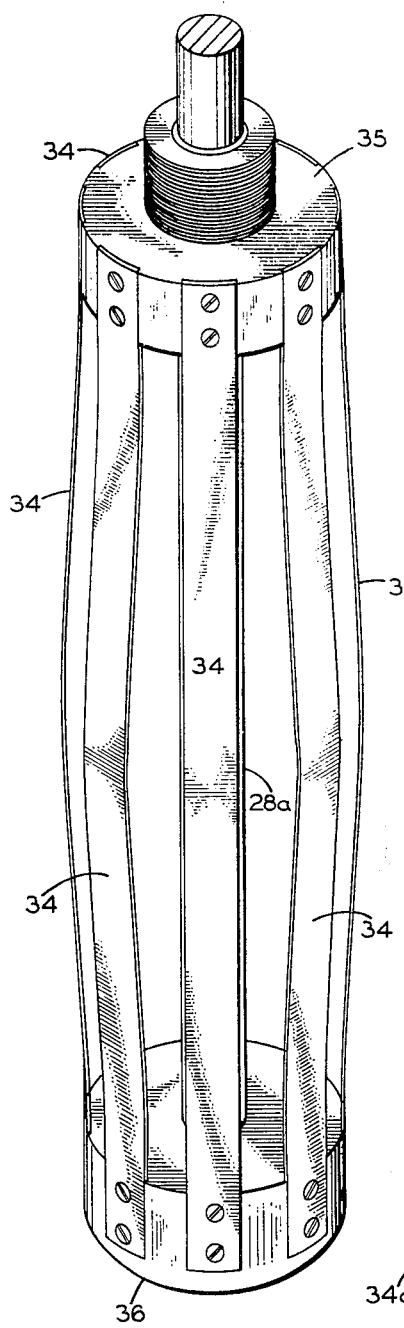
FIG. 9 illustrates an alternate expanding device using flat spring steel strips.

FIG. 9 illustrates an alternate means for replacing the links shown in the previous figures by a plurality of relatively thin strips 34 of tempered spring materials secured to collars 35 at both outer ends of the piston rod and projecting from the head.

Figure 10:
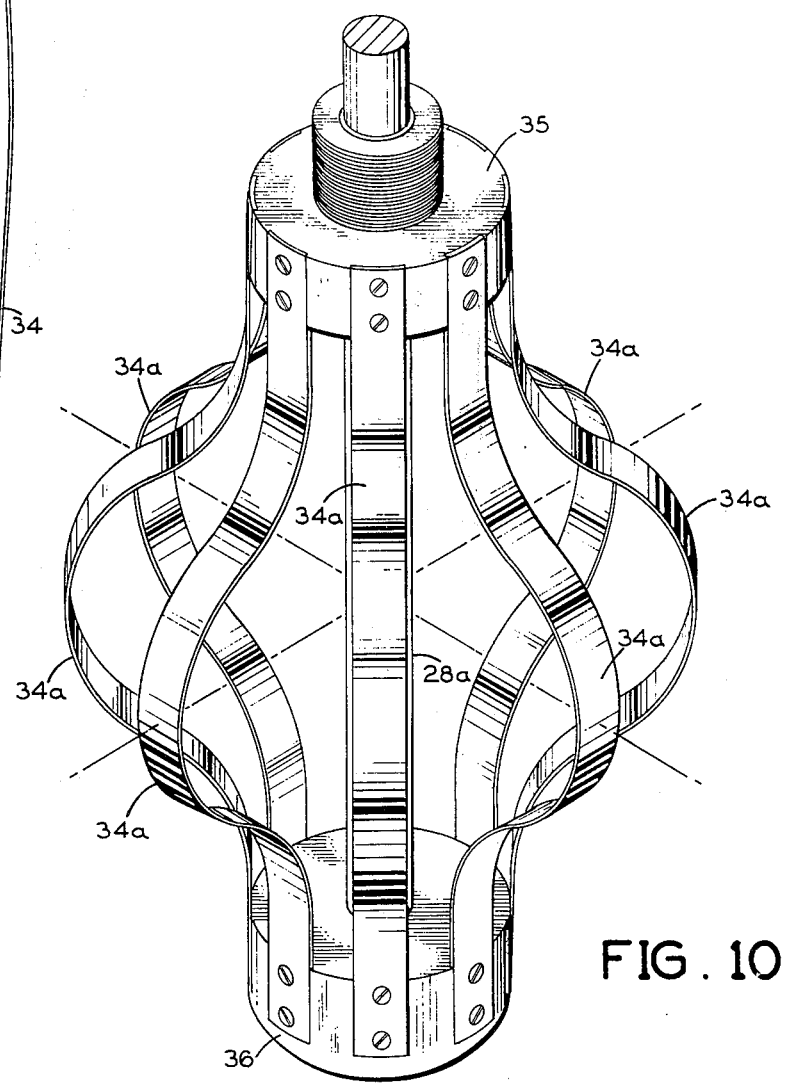
FIG. 10 illustrates the flexure of the steel strips when in the expanded position in the machine.

FIG. 10 illustrates the curved formation resulting from the operation of the hydraulic cylinder 6 secured to opposite collars around the piston rod. A plurality of flat flexible metal spring strips 34 may be forced into curved outward bends 34a for completing a formed outward expanded segmental tube without sharp vertical corner bends.

It is to be noted that the number and shape of the links or metal strips 34 may be of a wide variety to form expanded tubes to be cut in half for many uses, at low cost. In some cases a closure may be required, by the simple means of heat welding a plastic cover over the small end or securing an appropriate closure by adhesive means.

It will be apparent to those skilled in this art that each of the three double acting hydraulic cylinders may be manually controlled in proper sequence by the operation of manual valves for controlling pressurized hydraulic fluid in each cylinder for its dual operation. It is further to be understood that a motor driven controller may be used to operate the valves required to control the dual movement of the hydraulic cylinders in pre-timed sequence.

It is also apparent that electric heaters may be used or in contact with the heated container with well known thermostatic control to maintain the water or other liquid therein at a predetermined temperature sufficient to soften the plastic tubing.

It is also apparent that artificial refrigeration tubes may be in or against the cooling container for maintaining a low temperature to rapidly cool and rigidize the pre-formed plastic tube.

It is also apparent that the expandable links and expandable spring strips used to form the softened plastic tube may include a wide choice of shapes and design to produce corresponding shapes and designed in the expanded tube.

It is to be understood that certain modifications in construction are intended to come within the above specification.

Having described my invention, I claim:

1. A machine for expanding thermoplastic tubing including in combination:

means forming a base for supporting a container for heated liquid;
a container for heated liquid on said base;
support means rising above said base;
head means mounted reciprocatively on said support means above said base for reciprocation toward and away from said container on said base;
drive means operatively associated with said head means for reciprocating said head means; and
expanding means mounted on said head means comprising a rod secured to said head means and extending downward therefrom for reciprocation thereby;
a plurality of angularly spaced upper links pivotally fixed relative to said rod;
a plurality of angularly spaced lower links pivotally secured relative to said rod;
and a plurality of angularly spaced links each interconnecting one of said lower links to one of said upper links, whereby said links are adapted to expand segments of the tubing when heated in said container to provide a tubular plastic article having angularly spaced outwardly extending projections.

2. A machine for expanding the central portion of a thermal plastic tubing of predetermined dimensions comprising a means forming a base,
an open heating container of predetermined dimensions adapted to retain water heated to a predetermined high temperature,
a vertical column of predetermined height secured central of said base;
an offset head means slidably secured on said column for vertical movement thereon and keyed against rotation thereon,
a first hydraulic means for lowering and raising said head means from upper and lower alternate positions when energized,
a second hydraulic means secured in vertical position in said offset head means;
a piston rod of said second hydraulic means adapted to vertical movement in downward and upward position when energized accordingly,
a plurality of first forming upper links pivotally secured in equal angular relation about the axis of said piston rod and movable outward therefrom from a normal downward position,
a flange coaxially secured to the lower end of said piston rod,
a second like plurality of links pivotally secured in like said angles around the periphery of said flange equidistant from the axis of said piston rod and normally in an upward position,
a third like plurality of links with each one thereof pivotally connected at one end to the lower end of said upper links and at the opposite end thereof pivotally connected to the upper end of each said lower links with all said links in their contracted position when said piston rod is in its downward position whereby said heating container is substantially filled with heated water and piston rod and all said contracted pluralities of links pivoted thereon are moved downward into a thermal plastic tube submerged in heated water in said heating container by the lowering action of said first hydraulic means and whereby the piston rod of said second hydrauilc means is moved upward for expanding all said pluralities of links in an outward direction and simultaneously expanding the central portion of said tube whereupon the energizing of said first hydraulic means in an upward direction will raise the now formed plastic tube above said heating container.

3. The construction recited in claim 2 including a plurality of manual valves connected by proper tubing from a source of pressurized hydraulic fluid and terminating in a pair of tubes to each said hydraulic means for energizing each means in opposite directions in proper sequence.

4. The construction recited in claim 2 wherein a motor driven control valve will operate all of said hydraulic means in proper sequence to produce a predetermined enlargement of the central portion of a thermal plastic tube and discharge same when rigidized.

5. The construction recited in claim 2 wherein the said links for expanding the plastic tube are shaped and formed to produce a predetermined shape and design of central enlargement of the said plastic tube when expanded.

6. The construction recited in claim 1 wherein said drive means includes a two-way hydraulic cylinder secured in said body for operating said rod when said cylinder is sequentially energized in opposite end portions for alternately moving said rod from its outer to its inward position.

7. The construction recited in claim 1 including electric elements for heating the liquid in the heating container to a predetermined temperature when energized.

8. A machine for expanding thermoplastic tubing including in combination:
   means forming a base for supporting a container for heated liquid;
   a container for heated liquid on said heat;
   support means rising above said base;
   head means mounted reciprocatively on said support means above said base for reciprocation toward and away from said container on said base;
   drive means operatively associated with said head means for reciprocating said head means; and expanding means mounted on said head means comprising
   a rod secured to said head means and extending downward therefrom for reciprocation thereby,
   a plurality of flexible expanding devices spaced apart circumferentially around said rod and each being elongated lengthwise of the rod,
   and means operatively connecting both ends of said expanding devices to said rod to be expanded outwardly by the axial movement of the rod in one direction, whereby to expand corresponding portions of the thermoplastic tubing in the heated liquid in said container to form a tubular plastic article having circumferentially spaced outwardly extending projections.

9. A machine according to claim 8, wherein each of said expanding devices is a flexible and resilient strip.

* * * * *